US012686109B2

(12) United States Patent
Harwood et al.

(10) Patent No.: US 12,686,109 B2
(45) Date of Patent: Jul. 21, 2026

(54) WOODTURNING SCRAPER HANDLE SYSTEM

(71) Applicant: Ashley Harwood LLC, Charleston, SC (US)

(72) Inventors: Ashley Harwood, Charleston, SC (US); Donald Martin Zierold, Cleveland, TN (US); James Lawrence Lytle, Jr., Fletcher, NC (US)

(73) Assignee: Ashley Harwood LLC, Charleston, SC (US)

( * ) Notice: Subject to any disclaimer, the term of this patent is extended or adjusted under 35 U.S.C. 154(b) by 574 days.

(21) Appl. No.: 18/320,850

(22) Filed: May 19, 2023

(65) Prior Publication Data

US 2023/0373076 A1 Nov. 23, 2023

Related U.S. Application Data

(60) Provisional application No. 63/348,663, filed on Jun. 3, 2022, provisional application No. 63/344,377, filed on May 20, 2022.

(51) Int. Cl.

| | |
|---|---|
| ***B27G 15/00*** | (2006.01) |
| ***B25G 1/10*** | (2006.01) |
| ***B25G 3/26*** | (2006.01) |

(52) U.S. Cl.
CPC ............... *B25G 3/26* (2013.01); *B25G 1/102* (2013.01); *B27G 15/00* (2013.01)

(58) Field of Classification Search
CPC .......... B27G 15/00; B25G 1/08; B25G 1/102; B25G 3/26
USPC .......................................................... 142/56
See application file for complete search history.

(56) References Cited

U.S. PATENT DOCUMENTS

| | | | | |
|---|---|---|---|---|
| 11,333,495 B1 * | 5/2022 | Caprio | G01C 9/28 |
| 2012/0267008 A1 * | 10/2012 | Batty | B27G 15/00 76/119 |
| 2014/0216605 A1 * | 8/2014 | Batty | B27G 17/04 76/119 |
| 2021/0197347 A1 * | 7/2021 | Macor | B25G 1/085 |
| 2021/0291341 A1 * | 9/2021 | Granado | B23D 49/12 |

* cited by examiner

*Primary Examiner* — Alan Snyder
(74) *Attorney, Agent, or Firm* — Kubota & Basol LLP

(57) ABSTRACT

The present invention surrounds a handle system configured to receive a woodworking tool intended for use in woodturning operations. A blade is constrained between two removable handle sides, with the sides being removably interconnected using magnets wherein the handle sides adapted for being separated without the need for tools. The handle system includes the ability to use a double-ended scraper blade allowing a user to configure the blade to use a first cutting edge, or a second cutting edge as desired.

20 Claims, 8 Drawing Sheets

WOODTURNING SCRAPER HANDLE SYSTEM

CROSS REFERENCE TO RELATED APPLICATIONS

This application claims the benefit of U.S. Provisional Patent Application No. 63/344,377 entitled "WOODTURNING SCRAPER HANDLE SYSTEM" filed on May 20, 2022; and U.S. Provisional Patent Application No. 63/348,663 entitled "WOODTURNING SCRAPER HANDLE SYSTEM" filed Jun. 3, 2022, wherein the entire contents of the forementioned applications are incorporated herein by reference in their entirety for all purposes.

FIELD OF THE INVENTION

The present invention is directed to a handle system configured to receive a woodworking tool intended for use in woodturning operations. In woodturning, a scraper relies on a sharpened edge, with or without a burr, which scrapes at a wood surface rather than cutting or shearing it.

BACKGROUND OF THE INVENTION

Woodturning tools surround the use of a sharpened cutting tool which is configured to be held statically in relation to a piece of wood which is rapidly rotated, typically between 50-2500 RPM, about an axis on machinery such as a lathe. The static cutting tool, having a sharpened distal end, is advanced toward and into the surface of the piece of wood to carve a desired profile or shape into the piece of wood as it turns.

Due to the speed at which the wood piece rotates, a craftsperson (also known as a "woodturner") is able to effectively make identical radius cuts around the axis of rotation. For this reason, woodturning is particularly advantageous when manufacturing items having at least one portion having a circular cross section in relation to an axis of rotation. For example Finished pieces which are commonly made with woodturning, each typically having a circular cross-section about an axis, include spindle legs for furniture, baseball bats, candlestick holders, and bowls.

Cutting tools which are commonly used by woodturners include, but are not limited to gouges, parting tools, scrapers, and skews. Each of these cutting tools provide a particular function and are available in a variety and shapes and sizes. Woodturning tools are commonly affixed to a handle to provide a woodturner a comfortable handle and leverage as the end is advanced into the rotating wood.

Scrapers in particular are fashioned in a multitude of different forms for various purposes. For instance, a curved scraper comprises a radiused end configured for making finishing passes to smooth out concave curved surfaces such as the internal aspect of a bowl. Scrapers as referred to herein include, but are not limited to, scrapers having a straight edge, a curved edge, a swept edge, or a skewed edge.

Furthermore, scrapers exist in multiple forms such as a traditional scraper and a negative rake scraper. A traditional scraper comprises a straight-walled or tapering inward profile which allows the top edge of the scraper to be used to smooth or finish a surface. A negative rake scraper provides a top bevel configured to reduce the chances of the cutting edge from catching on the rapidly rotating piece and throwing the sharp tool, which could cause injury to a user or bystander or creating chatter which could damage the surface of the wood being scraped.

Due to the various types of scrapers required for certain wood turned pieces, it is an identified need to provide a handle system wherein a plurality of scrapers or other tools as required, be disposed therein for use.

SUMMARY OF THE INVENTION

Existing woodturning scrapers commonly have a permanently affixed handle or a handle which requires tools to remove the handle. It is an aspect of certain embodiments of the present invention to provide a handle configured to receive a plurality of tools therein for use for woodturning or other purposes, wherein the handle is easily and rapidly removed without the need for additional tools.

It is an aspect of certain embodiments of the present invention to provide an easily removable handle comprising a locator pin which ensures proper location of a blade within a cavity within the handle. The locator pin further provides a positive lock wherein the blade cannot be withdrawn in a longitudinal direction from the handle without removal of the locator pin. In order to remove the blade from the handle, a user removes the locator pin prior to removing the blade in a longitudinal direction. Alternatively, a user can separate a first half of the handle system from the second half of the handle system, thereby allowing the blade to be removed in a direction axial to the locator pin.

It is an aspect of certain embodiments of the present invention to provide a handle comprising a first side and a second side that are interconnected to house and hold a blade for use. The handle allows a user to separate the sides without the use of tools. The handle of certain embodiments are interconnected with magnets, while other fasteners such as—but not limited to—threaded fasteners, quarter-turn captive panel screws, push/pull captive panel screws, and twist-to-lock press-fit captive-panel retractable spring plungers are within the spirit and scope of the present invention. The first side and the second side are configured to interconnect wherein the blade extends outward from a first end of the interconnected first side and second side when fully assembled.

While certain embodiments of the present invention comprise a handle intended to be separable without the use of tools, certain embodiments comprise a first finger recess interconnected with a first end of the second side wherein the first finger recess at the first end is intended for a user to place their finger to provide a better grip on the second side of the handle system to assist in separating the second side from the first side. The first finger recess as shown comprises a radiused indentation, but is not limited thereto. Further embodiments of a handle system comprise a second finger recess—typically in the form of a slot but not limited thereto—disposed between the first handle and the second handle wherein a screw-driver, coin, or other suitable object within the second finger recess to assist in the separation of the first side from the second side. The finger recesses in the embodiments shown are not intended to be limiting to the location or quantity of finger recesses. Embodiments wherein a finger recess is located in any alternate location on an internal aspect of the second side, the first side, or in both the first side and second side are within the spirit and scope of the present invention.

It is an aspect of certain embodiments of the present invention to provide a scraper comprising a first scraper blade at a first distal end, and a second scraper blade at a second distal end. The dual-ended scraper as presented herein provides dual purpose for a user in woodturning processes wherein the user can configure a scraper handle system in a first configuration wherein the first scraper blade extends outward from the handle and the second scraper blade is housed safely within the handle. Alternatively, the user can configure the scraper handle system wherein the second scraper blade extends outward from the handle and the first scraper blade is house safely within the handle. Although embodiments discussed herein surround scraper blades, embodiments wherein the scraper blade comprises alternate woodturning tools such as a parting tool are within the spirit and scope of the present invention. Certain embodiments of the present invention comprise a protective sheath wherein the protective sheath covers an exposed blade to prevent injury to a user and to prevent the blade from being dulled from contact with other objects. Furthermore, alternate embodiments where a handle comprises a sheath form wherein the blade is inserted within the sheath longitudinally are within the spirit and scope of the present invention.

When woodturning operations are performed, measurements are often important. It is an aspect of the present invention to allow a user to take a measurement through the use of a measuring feature interconnected with the handle.

Furthermore, during some woodturning operations it is important to maintain a scraper, such as shown in embodiments here, in a level orientation. Thus, it is an aspect of certain embodiments of the present invention to provide a user a level indicator device to indicate whether or not a woodturning tool is level. Certain embodiments shown herein include a level indicator, such as a bubble level, to indicate to a user whether or not the tool is held in a level configuration. Alternative level indicators such as electronic level indicators, or inclinometers are within the spirit and scope of the present invention.

During woodturning operations, a tool may experience vibration or chatter which can negatively impact the finished piece. Furthermore, the vibration and chatter can result in discomfort or, in extreme examples, the user not being able to properly feel or maintain the woodturning tool against the rotating piece. Such an effect on the user can be uncomfortable, and potentially dangerous. With prolonged exposure, vibration and chatter can have lasting negative effects such as numbness in the hands. It is an aspect of certain embodiments of the present invention to provide a handle system with vibration damping qualities. In certain embodiments, the first side of the handle and the second side of the handle comprises a vibration damping material. Furthermore, alternative known vibration damping strategies which are not disclosed herein are within the spirit and scope of the present invention.

It is a further aspect of certain embodiments of the present invention to provide a handle which comprises a material which resists absorption of moisture or swelling due to humidity, does not suffer from corrosion emanating from wood tannins, provides heat dissipation qualities to mitigate heat generated from the use of the blade inserted therein. It is a further aspect that the handle material is chemical resistant and impact resistant.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

DETAILED DESCRIPTION OF VARIOUS EMBODIMENTS

Figure 1:
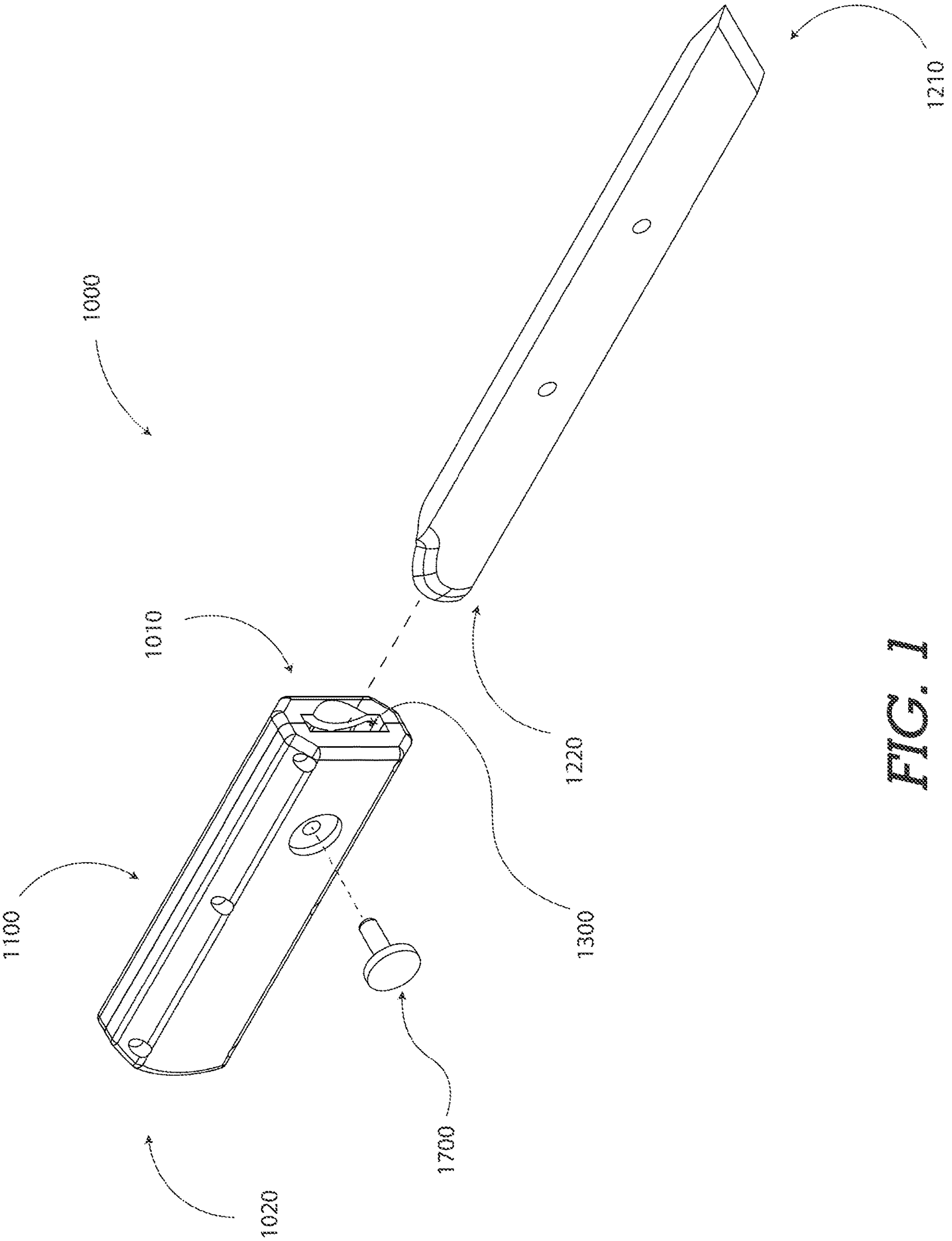
FIG. 1—An exploded perspective view of certain embodiments of the present invention FIG. 2—An exploded perspective view of certain embodiments of the present invention FIG. 3A—A front side of a first side of handle of certain embodiments of the present invention FIG. 3B—A rear side of a first side of handle of certain embodiments of the present invention FIG. 4A—A front side of a second side of handle of certain embodiments of the present invention FIG. 4B—A rear side of a second side of handle of certain embodiments of the present invention FIG. 5—A perspective view of a blade of certain embodiments of the present invention FIG. 6A—A perspective view of certain embodiments in an assembled first configuration FIG. 6B—A perspective view of certain embodiments in an assembled second configuration FIG. 7A—An end view of certain embodiments of the present invention FIG. 7B—A rear view of certain embodiments of the present invention FIG. 7C—A front view of certain embodiments of the present invention FIG. 8A—A perspective side view of certain embodiments of the present invention FIG. 8B—A perspective side view of certain embodiments of the present invention
Figure 2:
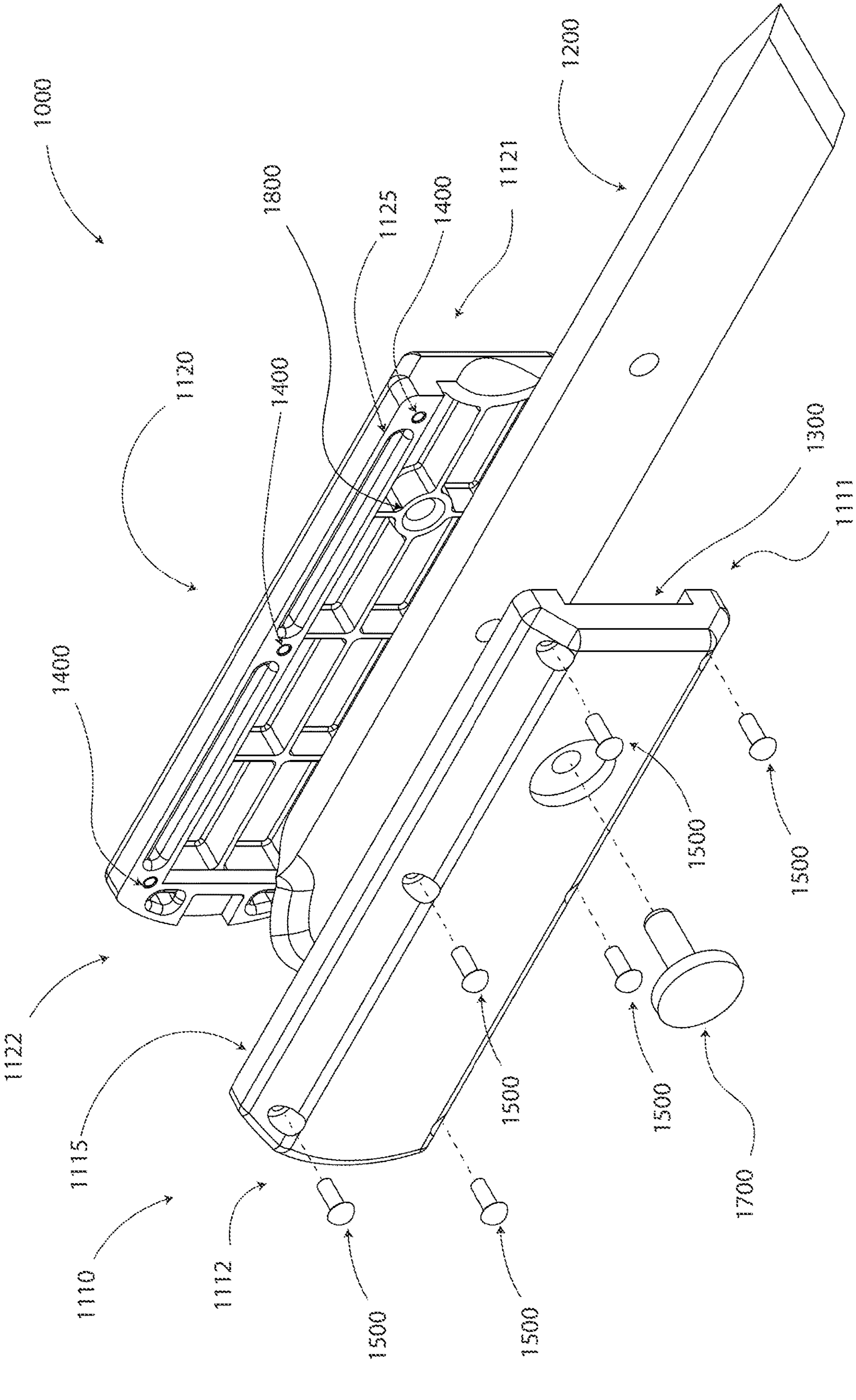
Figure 4A:
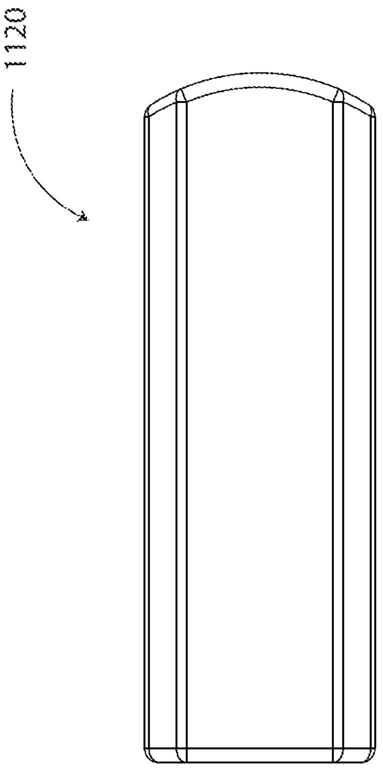
Figure 4B:
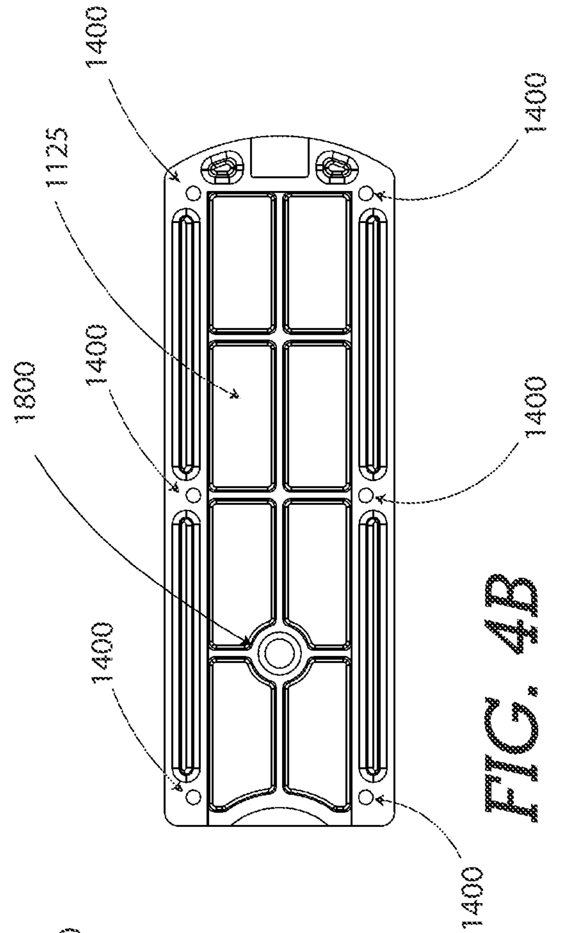
Figure 3A:
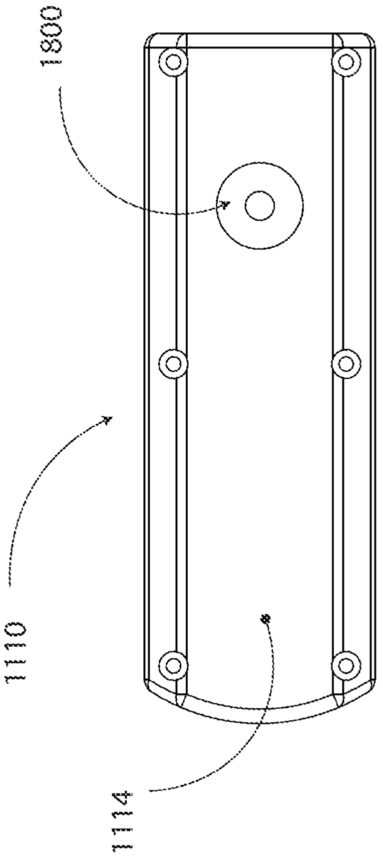
Figure 3B:
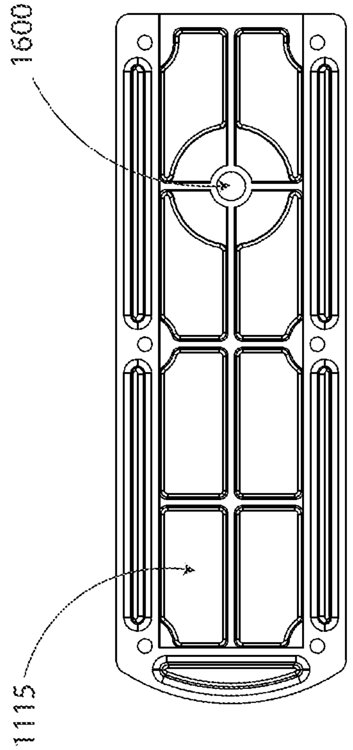

Certain embodiments of the present invention, as shown in FIG. 1-FIG. 2 for example, comprise a handle system 1000 comprising a handle 1100 and a blade 1200 wherein the blade is configured to be removable from the handle. The blade 1200 is retained within a recess or cavity 1300 of the handle in a manner such that a first end 1210 of the blade extends outward from the leading end 1010 of the handle, with a second end 1220 of the blade stored within the handle 1100. The cavity 1300 of the handle system 1000 in certain embodiments is coincident with a leading end 1010 of the handle system and extends rearward toward the trailing end 1020 of the handle system wherein the second end 1220 of the blade is stored within the handle system proximal to the trailing end 1020 of the handle system.

In certain embodiments, shown in FIG. 2 for example, a handle 1100 comprises a first side 1110 and a second side 1120 wherein the interconnection of an internal aspect 1115 of the first side with an internal aspect 1125 of the second side results in a cavity 1300 therebetween configured to receive a blade 1200 therein. In certain embodiments the sides 1110,1120 of the handle are removably interconnectable using magnets 1400 as shown, however alternate embodiments using fastening devices such as—but not limited to—threaded fasteners, quarter-turn captive panel screws, push/pull captive panel screws, and twist-to-lock press-fit captive-panel retractable spring plungers are within the spirit and scope of the present invention.

In certain embodiments, shown in FIG. 2-FIG. 4B for example, a first side 1110 of a handle comprises at least one pin 1500, wherein the pin 1500 comprises a ferromagnetic material. The second side of the handle comprises at least one magnet 1400 configured to align and interconnect with the pin 1500 of the first side wherein interconnecting the first side of the handle with the second side of the handle results in the interconnection of the pin 1500 with the magnet 1400, and the sides of the handle being constrained by the ferromagnetic attraction between the magnet and the pin, also referred to herein as magnetic attraction. In certain embodiments, the first side 1110 comprises a plurality of pins 1500 and the second side comprises a plurality of magnets 1400 configured to align and interconnect to constrain the first side of the handle 1110 and the second side 1120 of the handle. While embodiments shown herein comprises a first side 1110 with pins 1500 and a second side 1120 with magnets 1400, embodiments wherein the first side 1110 comprises magnets 1400 and the second side 1120 comprises magnets 1400, wherein the magnets 1400 of the first side and the magnets of the second side are configured to align and attract each other with magnetic attraction.

Certain embodiments, as shown in FIG. 3A-FIG. 4B for example, comprise a handle 1100 having a first side 1110 and a second side 1120, wherein the internal aspects 1115, 1125 of the sides are configured to receive and interconnect with a blade (FIG. 2). In certain embodiments the first side 1110 further comprises an aperture 1600 laterally therethrough wherein the aperture 1600 extends from an outer aspect 1114 of the first side to an internal aspect 1114 of the first side.

Figure 5:
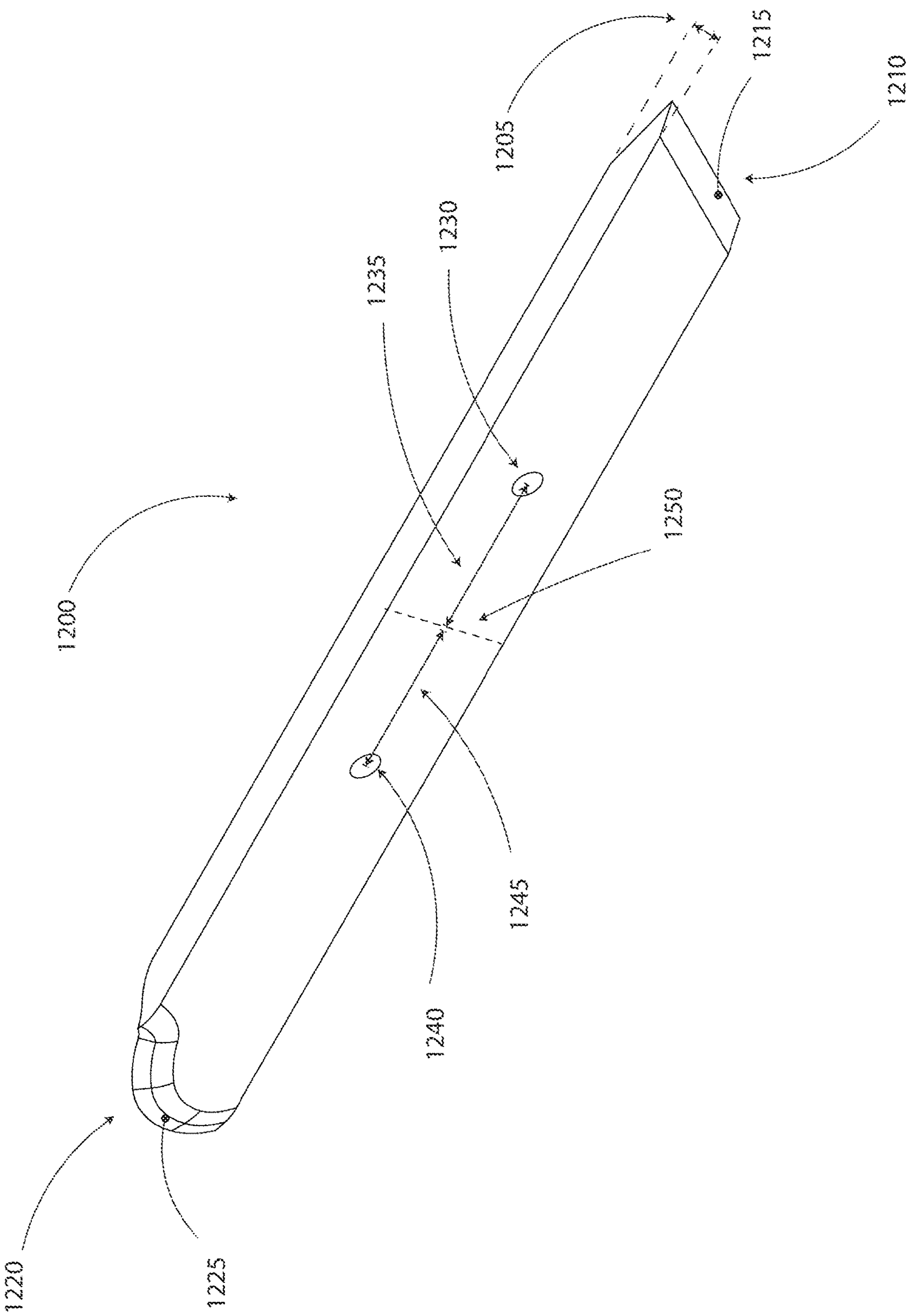
Figure 6A:
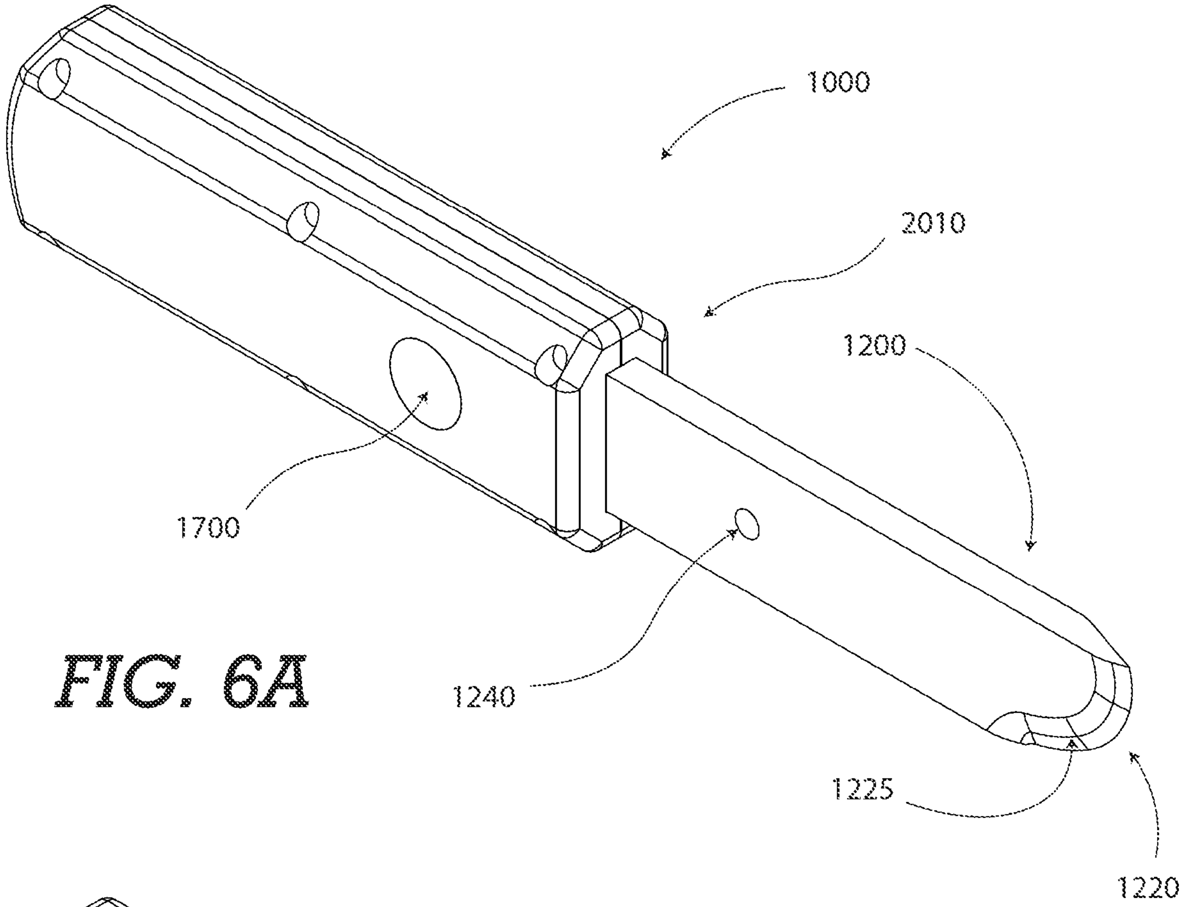
Figure 6B:
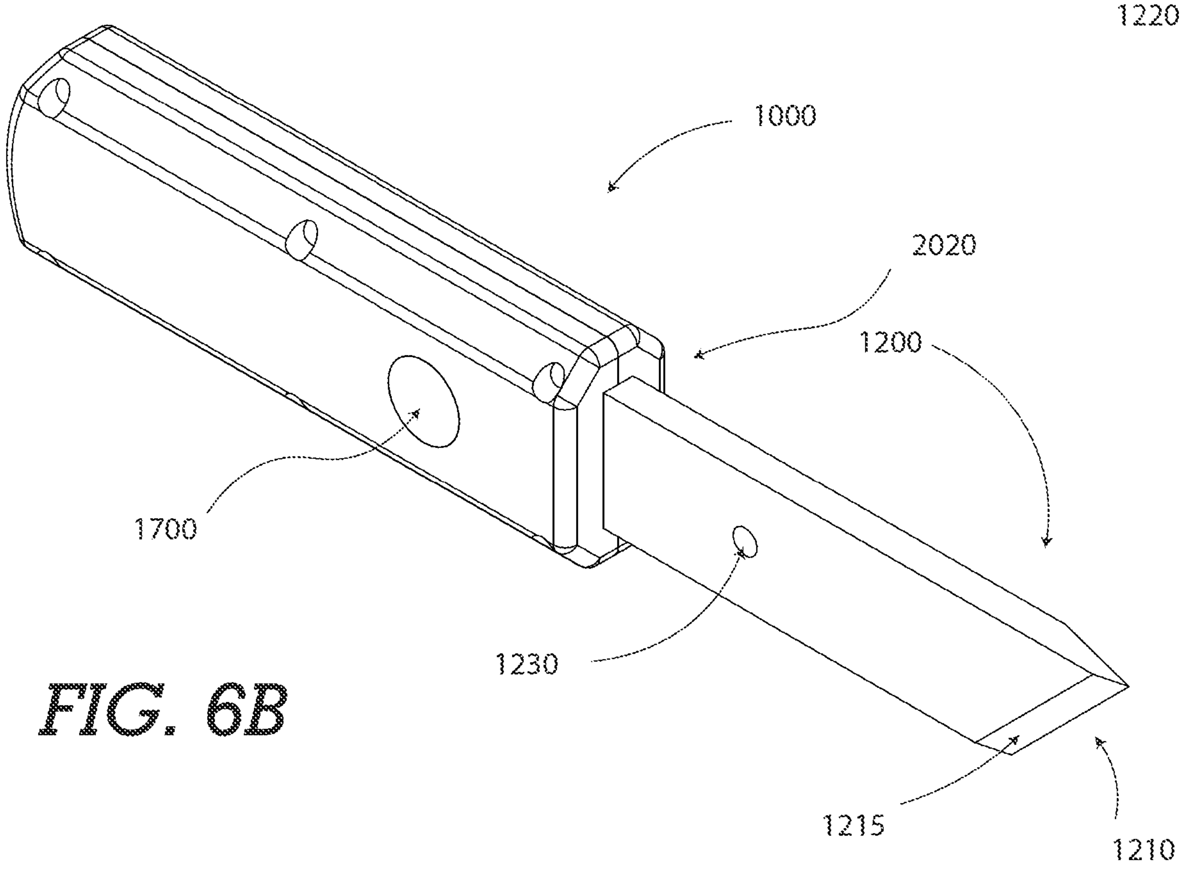

Certain embodiments of a woodturning scraper handle system, shown in FIG. 5-FIG. 6B for example, comprise a blade 1200 wherein the blade comprises a first cutting edge 1215 at a first end 1210 and a second cutting edge 1225 at a second end 1220. As disclosed herein a "cutting edge", in addition to its ordinary and customary meaning, includes a burr intended for scraping. The blade further comprises a first aperture 1230 through the thickness 1205 of the blade offset a first distance 1235 from a centerline 1250 of the blade. The first aperture 1230 is configured such that when the first end 1210 of the blade is inserted within the handle in a first configuration 2010, the first aperture 1230 of the blade aligns with the aperture 1600 of the first side, and thereby the locator pin 1700. Thereby second cutting edge 1225 is exposed for use in the first configuration 2010. In certain embodiments, the blade further comprises a second aperture 1240 offset from the centerline 1250 of the blade by a second distance 1245. In certain embodiments the first distance 1235 and the second distance 1245 are equal, however embodiments of the present invention are not restricted thereto. The second aperture 1240 is configured such that when the second end 1220 of the blade is inserted within the handle 1100 in a second configuration 2020, the second aperture 1240 of the blade aligns with the aperture 1600 of the first side, and thereby the locator pin 1700. Thereby the first cutting edge 1215 is exposed for use in the second configuration. While embodiments of a blade 1200 comprising two edges shown herein comprise two apertures, embodiments wherein a single aperture through the blade is configured to align with the aperture 1600 of the first side in a first configuration 2010 or second configuration 2020 are within the spirit and scope of the present invention. Furthermore, while embodiments shown comprise apertures through the thickness of the blade, notches through the thickness of the blade which are coincident with a longitudinal edge of the blade are within the spirit and scope of the present invention.

Although embodiments show apertures of the blade comprising a thru-hole, for the purposes of the present application, an "aperture", in addition to its ordinary and customary meaning, includes a notch in a perimetral edge of the blade.

In certain embodiments, as shown in FIG. 1-FIG. 6B for instance, a locator pin 1700 is configured to interconnect between at least a first side 1110 of the handle and through an aperture (1230, 1240) of the blade wherein when the locator pin 1600 is interconnected with the handle system 1000 the blade 1200 is constrained from being removed in a longitudinal direction from the handle system. The locator pin 1700 is interconnected with the handle system 1000 when the locator pin is inserted through an aperture 1600 through the first side, and though an aperture (1230, 1240) of the blade. When the locator pin 1700 is removed, the blade 1200 is unconstrained and the blade 1200 can be removed in a longitudinal direction. While certain embodiments shown herein illustrate the locator pin 1700 as a removable element, in certain embodiments the locator pin 1700 is permanently interconnected with the first side 1110 of the handle. In certain embodiments, the locator pin 1700 is affixed to the first side 1110 of the handle, wherein assembly of the first side 1110 with the second side 1120 with the locator pin 1700 aligned with an aperture (1230, 1240) of the blade serves to constrain the blade 1200 within the handle 1000, and wherein separating the first side 1110 from the second side 1120 results in the blade 1200 being unconstrained in relation to the handle system 1000.

In certain embodiments, a second side 1120 of the handle system comprises a recess 1800 on an internal aspect 1125 of the second side wherein the locator pin 1700 is configured to be inserted through an aperture 1600 in the first side, through an aperture (1230,1240) of the blade, and into the recess 1800 on an internal aspect 1125 of the second side. Embodiments wherein the recess 1800 comprises a thru-hole, and embodiments wherein the locator pin 1700 extends through the first side 1110 and the second side 1120 are within the spirit and scope of the present invention.

In certain embodiments, shown in FIG. 6A-FIG. 6B for example, a blade 1200 comprises a first end 1210 having a first edge 1215 and a second end 1220 having a second edge 1225. The first edge 1215 and the second edge 1225 can be configured similarly or in differently. The edge type configurations that may be used include, but are not limited to, a straight edge scraper, a curved edge scraper, a swept edge scraper, a skewed edge scraper, parting tools.

In certain embodiments of the present invention, a handle system 1000 comprises a handle 1100 comprising a vibration damping material. In certain embodiments, as shown in FIG. 1-FIG. 8B for example, the handle 1100 comprises a vibration damping material such as urethane polymer comprising mechanical qualities of a 55 D-75 D durometer. A non-ferromagnetic material provides advantages to isolate the magnetism of the magnets 1400 from affecting the 1200 blade which is commonly made of a steel alloy. Without isolating the blade 1200 from the magnets 1400, the material of the blade 1200 may become magnetized which affects the usability of the blade 1200 as a magnetized blade may not glide freely across a tool rest as necessary for use with a lathe. Handles comprising alternative materials such as rubbers, polyurethanes, urethanes outside of the indicated durometer range, or other polymeric compounds are within the spirit and scope of the present invention. Furthermore, the use of a vibration damping material as a first side 1110 of the handle, the second side 1120 of the handle, the first side 1110 and second side 1120 of the handle, or between the sides of the handle 1100 and the blade 1200—are within the spirit and scope of the present invention.

Figure 7A:
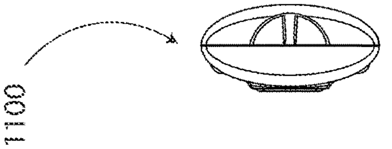
Figure 7B:
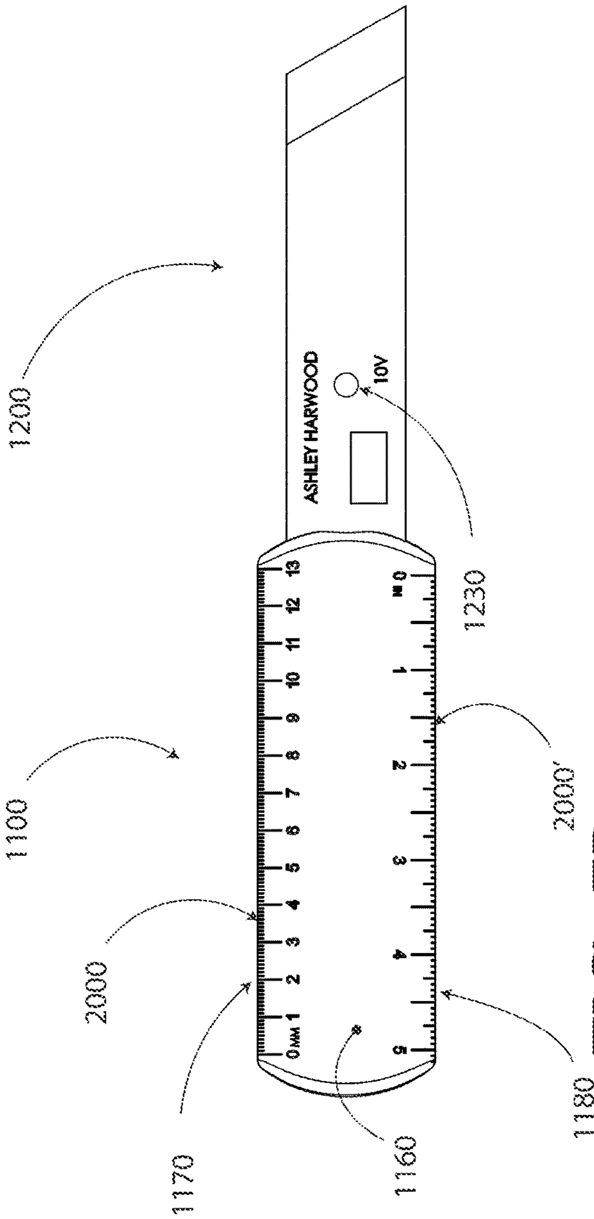
Figure 7C:
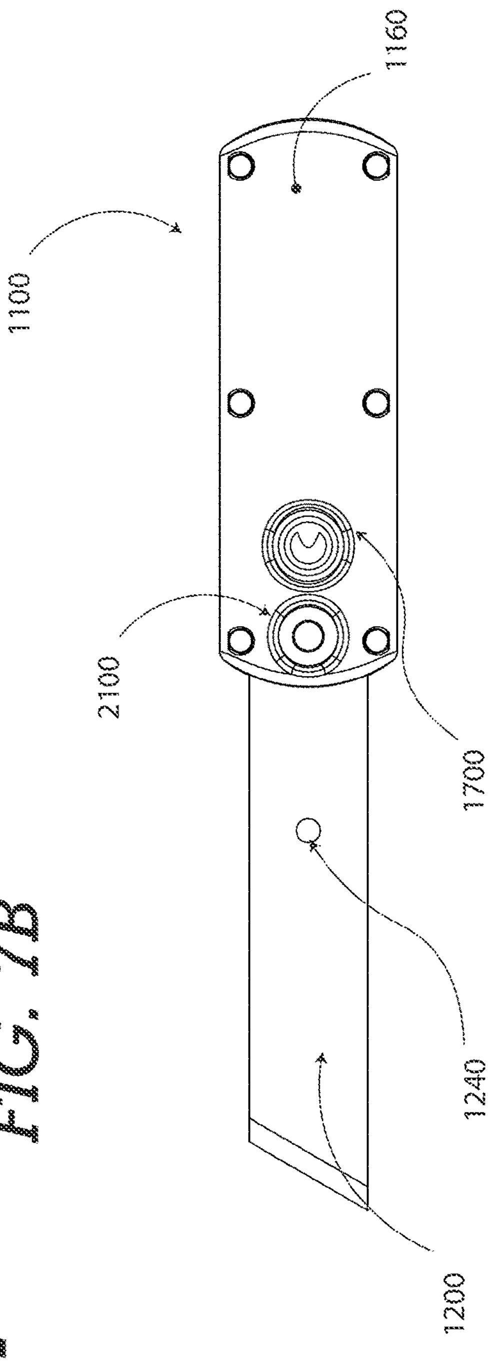

In certain embodiments as shown in FIG. 7A-FIG. 7C, a handle system 1000 comprises a handle 1100 further comprising a measuring device 2000 interconnected thereto. In certain embodiments, the measuring device 2000 is displayed longitudinally along an external surface 1160 of the handle. As shown in FIG. 7A—FIG. 7C, certain embodiments comprise a first measuring device 2000 in a first measuring scale (such as metric units), and a second measuring device 2000' in a second measuring scale (such as imperial units). The measuring device 2000 as shown in FIG. 7, comprises embossed increments and numerical elements. However, alternative measuring devices 2000 comprising printed, painted, or raised increments and numerical elements are within the spirit and scope of the present invention. Furthermore, alternative embodiments wherein the measuring device 2000 comprises an extendable retractable measuring device which extends from the handle are within the spirit and scope of the present invention. In certain embodiments, as shown in FIG. 7B for example, a measuring device is aligned with a first longitudinal edge 1170 or a second longitudinal edge 1180 of the handle.

In certain embodiments of the present invention, such as shown in FIG. 7C of the present invention, a level indicator device 2100 is interconnected with the handle 1100. In certain embodiments as shown, the level indicator 2100 comprises a bulls-eye level. However, alternative level indicators such as a spirit level or inclinometer, are within the spirit and scope of the present invention.

In certain embodiments as shown in FIG. 1-FIG. 4B, and FIG. 6A-FIG. 6B, the handle 1100 comprises a faceted shape wherein the handle comprises a plurality of planar surfaces. Alternatively, in certain embodiments such as shown in FIG. 7A-FIG. 8B, the handle 1100 comprises a curvilinear surface. Furthermore, embodiments wherein the handle 1100 comprises a faceted surface in combination with a curvilinear surface are within the spirit and scope of the present invention. In certain embodiments, as shown in FIG. 7A, the handle comprises an oval shaped profile, while alternate embodiments having differing profiles are within the spirit and scope of the present invention.

Figure 8A:
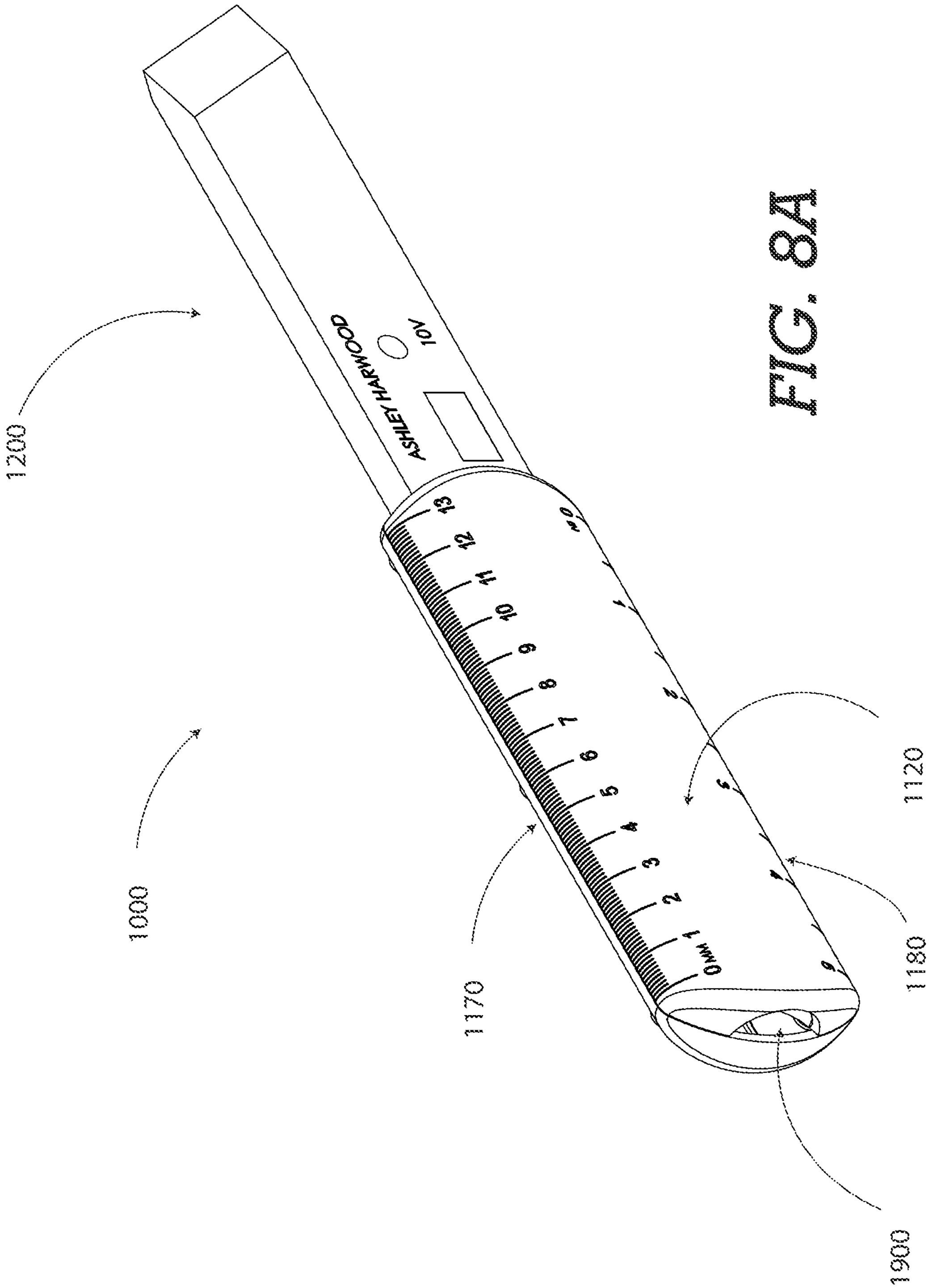
Figure 8B:
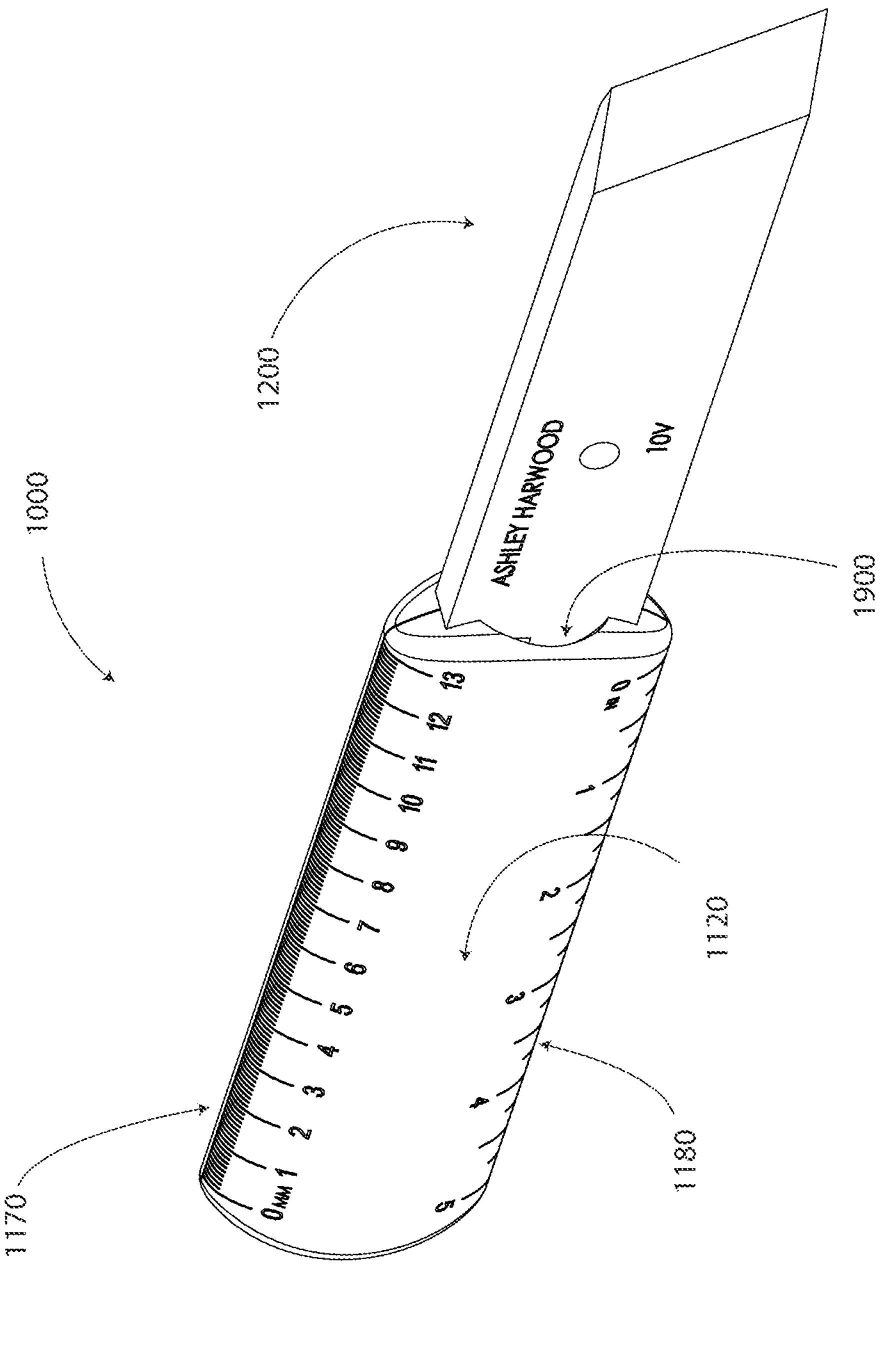

In certain embodiments, as shown in FIG. 8A-FIG. 8B for instance, a first end 1010 of the handle comprises a finger recess 1900, and in certain embodiments a second end 1020 of the handle comprises a finger recess 1900. It may be desired for both the first end 1010 and the second end 1020 of the handle each to comprise a finger recess 1900. While embodiments as shown comprise the finger recess 1900 as interconnected with the second side 1120 of the handle, embodiments disclosed herein are not limited thereto. Furthermore, embodiments wherein the finger recess 1900 is located along a longitudinal edge (1170, 1180) of the handle are within the spirit and scope of the present invention. A finger recess 1900 is adapted to allow a user to place their finger therein to provide a better grip on the second side 1220 of the handle system to assist in separating the second side 1120 from the first side 1110, and thereby allow access to the blade 1200 within the handle system 1000 for operations such as removal, replacement, or reorienting the blade 1200.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A handle system for woodturning tools comprising:

a handle comprising a first side comprising an internal aspect, and a second side comprising an internal aspect, wherein the internal aspects of the first side and second side are removably interconnectable;

the handle further comprising a cavity extending in a longitudinal direction from a leading end of the handle toward a trailing end of the handle disposed between sides of the handle;

a blade comprising a first end with a cutting edge, and a second end with a cutting edge, and the blade further comprising at least a first aperture through a thickness of the blade located between the ends of the blade;

a locator pin configured to interconnect to the first side of the handle;

wherein, when interconnected with the first side of the handle, the locator pin extends away from the internal aspect of the first side of the handle, wherein, when interconnected with the first side of the handle, the locator pin is configured to extend into the cavity when the first side of the handle is interconnected with the second side of the handle, wherein a profile of the first aperture matches a profile of the locator pin in at least the longitudinal direction, and wherein aligning the locator pin with the first aperture of the blade, and aligning the blade within the cavity when the first side is interconnected with the second side, results in constraint of the blade within the cavity in the longitudinal direction.

2. The handle system of claim 1 wherein at least one of the two sides comprises a magnet interconnected thereto, wherein the magnet is configured to constrain the first side of the handle to the second side of the handle through magnetic attraction.

3. The handle system of claim 2, comprising a plurality of magnets interconnected to at least one of the two sides of the handle, wherein the magnets are configured to constrain the first side of the handle to the second side of the handle through magnetic attraction.

4. The handle system of claim 3, wherein the first side of the handle and the second side of the handle each comprise a non-ferromagnetic material construction.

5. The handle system of claim 2, further comprising a pin in the side opposite the side comprising the magnet, wherein the pin comprises a ferromagnetic material, wherein the pin is configured to align with the magnet when the first side and the second side are interconnected, and wherein the magnet is magnetically attracted to the pin.

6. The handle system of claim 5, further comprising a plurality of magnets and a plurality of pins interconnected to the first side and second side, wherein the pins comprise a ferromagnetic material, wherein the pins are configured to align with the magnets when the first side and the second side are interconnected, and wherein the magnets are magnetically attracted to the pins.

7. The handle system of claim 2, wherein at least one of the sides of the handle comprises a first finger recess adapted for a user to place their finger therein to provide improved grip for separating the first side from the second side.

8. The handle system of claim 7, wherein the first finger recess is disposed at the leading end or the trailing end of the handle.

9. The handle system of claim 7, further comprising a second finger recess, wherein the first finger recess is disposed at the leading end of the handle, and wherein the second finger recess is disposed at the trailing end of the handle.

10. The handle system of claim 2, wherein the blade further comprises a second aperture, wherein the first aperture is located offset toward the first end of the blade from a centerline of the blade, and the second aperture is located offset toward the second end of the blade from the centerline of the blade.

11. The handle system of claim 10, wherein in a first configuration the first aperture of the blade is configured to align with the locator pin, wherein the first end of the blade is disposed within the cavity, and the second end of the blade is exposed for use; and wherein in a second configuration the second aperture of the blade is configured to align with the locator pin, wherein the second end of the blade is disposed within the cavity, and the first end of the blade is exposed for use.

12. The handle system of claim 2, wherein the handle further comprises a level indicator device interconnected thereto.

13. The handle system of claim 12, wherein the level indicator device comprises a bulls-eye level.

14. The handle system of claim 13, wherein the level indicator device is located between the locator pin and the leading end of the handle.

15. The handle system of claim 12, wherein the level indicator device is interconnected to the first side of the handle.

16. The handle system of claim 12, wherein the handle further comprises a first measuring device interconnected to an external surface of the handle.

17. The handle system of claim 16, wherein the first measuring device is aligned with a first longitudinal edge of the handle.

18. The handle system of claim 17, wherein the handle further comprises a second measuring device interconnected to the external surface of the handle, wherein the first measuring device comprises a metric unit scale, and the second measuring device comprises an imperial unit scale.

19. The handle system of claim 18, wherein the first measuring device is aligned with a first longitudinal edge of the handle, and wherein the second measuring device is aligned with a second longitudinal edge of the handle.

20. A handle system for woodturning tools comprising:

a handle comprising a first side and a second side;

the sides of the handle configured are wherein interconnecting the sides results in a cavity, extending in a longitudinal direction from a leading end of the handle toward a trailing end of the handle, disposed between sides of the handle configured to receive a blade therein;

the first side and the second side interconnecting with magnets;

the first side further comprising locator pin extending into the cavity from an inner aspect of the first side;

the blade comprising a cutting edge on a first end, and a cutting edge at a second end;

the blade further comprising a first aperture offset a first distance from a centerline of the blade, wherein when the first end of the blade is inserted within the handle in a first configuration, the first aperture of the blade is configured to align with a locator pin, wherein a profile of the first aperture matches a profile of the locator pin in at least the longitudinal direction;

the blade further comprising a second aperture offset a second distance from centerline of the blade, wherein when the second end of the blade is inserted within the handle in a second configuration, the second aperture of the blade is configured to align with the locator pin, wherein a profile of the second aperture matches the profile of the locator pin in at least the longitudinal direction; and wherein aligning the locator pin with the first aperture, and interconnecting the first side with the second side constrains the blade in the longitudinal direction in a first configuration, and wherein aligning the locator pin with the second aperture, and interconnecting the first side with the second side constrains the blade in the longitudinal direction in a second configuration, and wherein removal of the first side from the second side results in the blade being unconstrained and allows the blade to be removed from the handle.

* * * * *